United States Patent [19]

Bock

[11] Patent Number: 5,675,431
[45] Date of Patent: Oct. 7, 1997

[54] RASTER OUTPUT SCANNER HAVING EXTERNALLY MOUNTED MIRRORS

[75] Inventor: Edward C. Bock, Webster, N.Y.

[73] Assignee: Xerox Corporation, Stamford, Conn.

[21] Appl. No.: 617,717

[22] Filed: Apr. 1, 1996

[51] Int. Cl.⁶ .................................................. G02B 26/08
[52] U.S. Cl. ..................... 359/216; 347/134; 347/261; 347/263
[58] Field of Search ................ 359/212, 216–219; 347/256–261, 263, 134; 358/474, 296

[56] References Cited

U.S. PATENT DOCUMENTS 4,800,401  1/1989  Sato et al. .
5,506,719  4/1996  Murakami et al. .................. 359/216

*Primary Examiner*—James Phan
*Attorney, Agent, or Firm*—John M. Kelly

[57] ABSTRACT

Raster output scanner assemblies, and systems which use such assemblies, having mirrors mounted on the outside of an outer frame. Slits in the outer frame enable light to reflect from the mirrors. Beneficially, the outside mirror or mirrors are protected from contamination by mounting the primary surface of the mirrors (the surface which reflects light) against the outer frame and by mounting a cover over the mirrors.

2 Claims, 4 Drawing Sheets

RASTER OUTPUT SCANNER HAVING EXTERNALLY MOUNTED MIRRORS

FIELD OF THE INVENTION

The present invention relates to raster output scanner configurations. In particular, the present invention relates to raster output scanners with smaller frame sizes.

BACKGROUND OF THE INVENTION

Electrophotographic marking is a well known method of copying or printing documents or other substrates. Electrophotographic marking is typically performed by exposing a light image of an original document onto a substantially uniformly charged photoreceptor. That light image discharges the photoreceptor so as to create an electrostatic latent image of the original on the photoreceptor's surface. Toner particles are then deposited onto the latent image so as to form a toner image. That toner image is then transferred from the photoreceptor, either directly or after an intermediate transfer step, onto a marking substrate such as a sheet of paper. The transferred toner powder image is then fused to the marking substrate using heat and/or pressure. The surface of the photoreceptor is then cleaned of residual developing material and recharged in preparation for the creation of another image.

While many types of exposure systems have been developed, a commonly used system is the raster output scanner (ROS). A raster output scanner is comprised of a laser beam source, a modulator for modulating the laser beam (which, as in the case of a laser diode, may be the source itself) such that the laser beam contains a digital representation of an image that is to be created, a rotating polygon having at least one reflective surface, input optics that collimate the laser beam, output optics which focus the laser beam into a spot on a photoreceptor's surface and which correct for various optical problems such as wobble, and, usually, one or more folding mirrors. The laser source, modulator, and input optics produce a collimated laser beam which is directed toward the polygon. As the polygon rotates reflective facet surfaces cause the laser beam to be swept along a scan plane. The swept laser beam passes through the output optics and is reflected by the mirrors so as to produce a sweeping spot on the charged photoreceptor which traces a scan line across the photoreceptor. Since the charged photoreceptor moves in a direction which is substantially perpendicular to the scan line, the sweeping spot raster scans the photoreceptor. By suitably modulating the laser beam as the spot raster scans the photoreceptor a desired latent image can be produced on the photoreceptor.

To assist the understanding of the present invention several things about electrophotographic marking machines should be understood. First, to reduce the size of the machine significant design effort is expended toward obtaining the smallest possible configuration of the various electrophotographic processing subsystems. Second, one of the largest components of an electrophotographic machine is the raster output scanner. In the prior art raster output scanners were implemented such that all of its optical components were contained within a sealed outer frame assembly. This protected the optical components from contamination by toner particles, paper debris, and/or other contaminates. For example, FIG. 1 illustrates a typical prior art raster input scanner located inside an outer frame 10.

As shown in FIG. 1, the outer frame assembly is sealed by a cover 12. Located within the outer frame is a diode assembly 14 which emits a laser beam onto the facets of a polygon 16. The polygon is rotated by a motor assembly 18, part of which fits through a hole in the outer frame. Laser light reflected by the polygon facets pass through scan lenses 20 which are mounted on a support 22. After passing through the scan lenses the laser beam is reflected by a first mirror 24 and by a second mirror 26, both of which are mounted on a first mirror carriage 28. From the second mirror 26 the laser beam is directed onto a third mirror 30, which is mounted on an interior wall 31 of the outer frame, and then onto a fourth mirror 32 which is mounted on a second mirror carriage 34. Light reflected from the fourth mirror 32 is directed through an exit window 36 which is located over a slit in the outer frame.

While locating the optical components of a raster output scanner within an outer frame is beneficial because the optical components are protected from contamination, it may not be the optimal configuration. Specifically, mounting the mirrors within the outer frame 10 means that the outer frame must be large enough to hold the mirrors and the mirror carriages. A raster output scanner configuration in which one or more mirrors are located outside of the outer frame would be beneficial.

SUMMARY OF THE INVENTION

The principles of the present invention provides for raster output scanners, and systems which use such scanner, which have reduced volumes. This is achieved by mounting one or more mirrors exterior to the outer frame. Beneficially, the outside mounted mirror or mirrors are protected from contamination by mounting the primary surface of the mirrors (the surface which reflects light) adjacent slits in the outer frame.

BRIEF DESCRIPTION OF THE DRAWINGS

Other aspects of the present invention will become apparent as the following description proceeds and upon reference to the drawings, in which.

DETAILED DESCRIPTION OF THE PREFERRED EMBODIMENT

Figure 2:
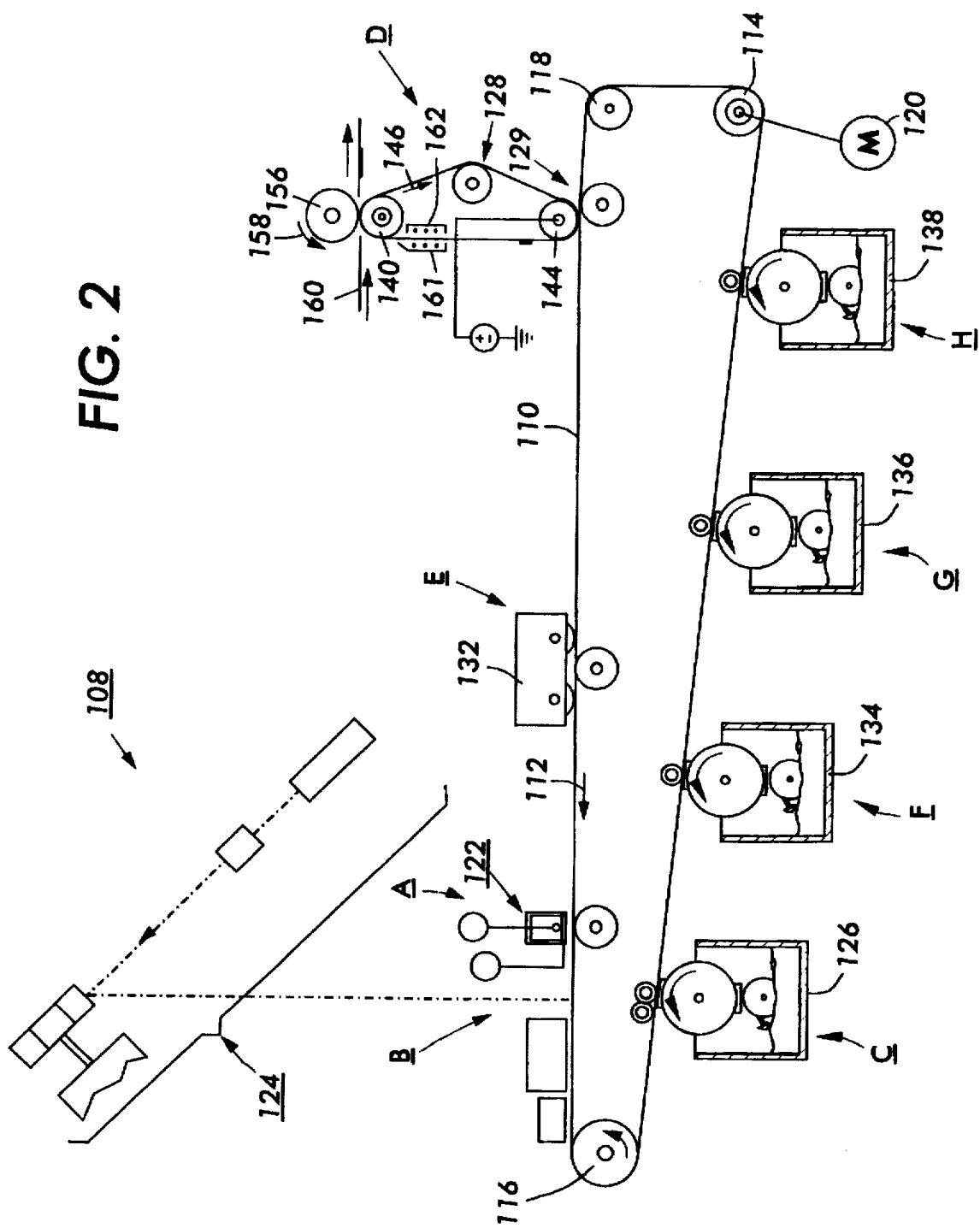
FIG. 2 schematically illustrates an electrophotographic printing machine which incorporates the principles of the present invention.

FIG. 2 illustrates an electrophotographic printing machine 108 that produces an original document. Although the principles of the present invention are well suited for use in such machines, they may also be suited for use in other applications. Therefore it should be understood that the present invention is not limited to the particular embodiment illustrated in FIG. 2 or to the particular application shown therein.

The printing machine 108 includes a charge retentive device in the form of an Active Matrix (AMAT) photoreceptor 110 which has a photoconductive surface and which travels in the direction indicated by the arrow 112. Photoreceptor travel is brought about by mounting the photoreceptor about a drive roller 114 and two tension rollers, the rollers 116 and 118, and then rotating the drive roller 114 via a drive motor 120.

As the photoreceptor moves each part of it passes through each of the subsequently described processing stations. For convenience, a single section of the photoreceptor, referred to as the image area, is identified. The image area is that part of the photoreceptor which is operated on by the various stations to produce toner layers. While the photoreceptor may have numerous image areas, since each image area is processed in the same way a description of the processing of one image area suffices to explain the operation of the printing machine.

As the photoreceptor 110 moves, the image area passes through a charging station A. At charging station A a corona generating scorotron 122 charges the image area to a relatively high and substantially uniform potential, for example about −500 volts. While the image area is described as being negatively charged, it could be positively charged if the charge levels and polarities of the other relevant sections of the copier are appropriately changed. It is to be understood that power supplies are input to the scorotron 122 as required for the scorotron to perform its intended function.

Figure 3:
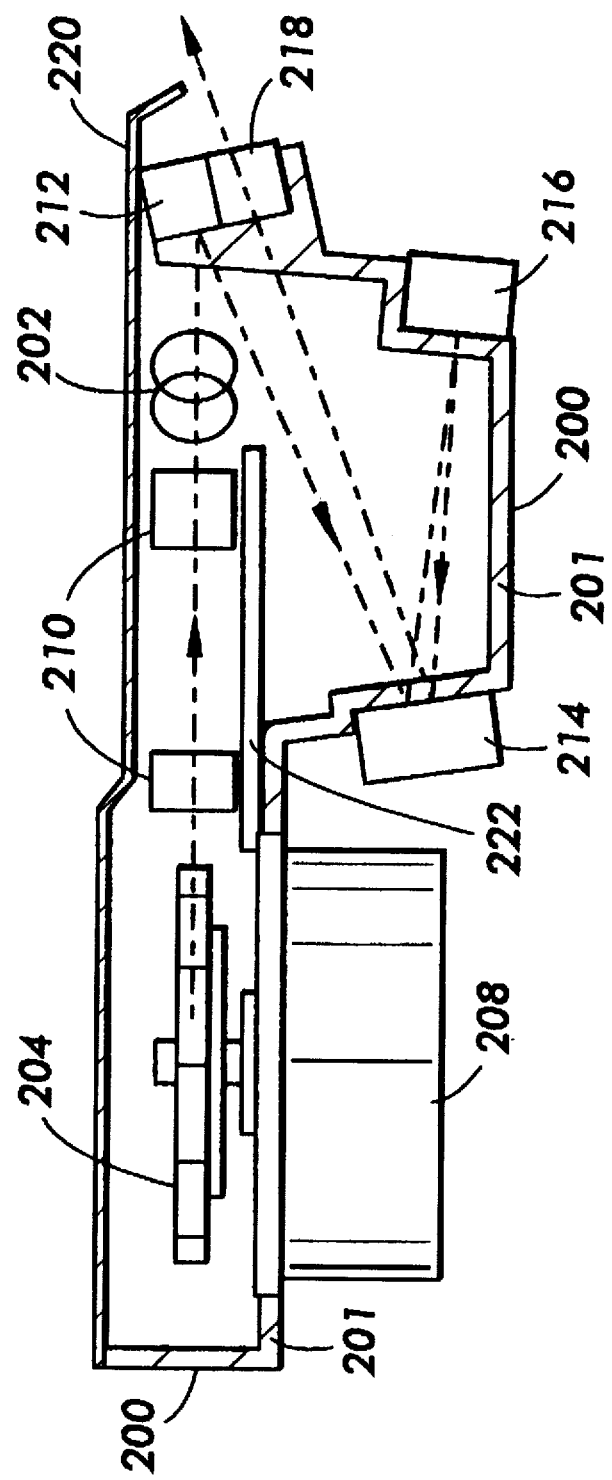
FIG. 3 schematically illustrates a side view of a raster output scanner according to the principles of the present invention.

After passing through the charging station A the now charged image area passes to an exposure station B. At exposure station B the charged image area is exposed to the output of a laser based raster output scanning assembly 124 which illuminates the image area with a light representation of a first color image, say black. That light representation discharges some parts of the image area so as to create a first electrostatic latent image. Since the principles of the present invention specifically relate to the Exposure station B, the raster output scanning assembly 124, which is schematically depicted in FIG. 3, is described in more detail subsequently.

After passing through the exposure station B, the now exposed image area passes through a first development station C. At the first development station C a negatively charged development material 126, which is comprised of black toner particles, is advanced to the image area. The development material is attracted to the less negative sections of the image area and repelled by the more negative sections. The result is a first toner layer on the image area.

After passing through the first development station C the image area is advanced to a transfusing module D. That transfusing module includes a positively charged transfusing member 128, which may be a belt, as illustrated in FIG. 2, or a drum which forms a first nip 129 with the photoreceptor. That nip is characterized by a first pressure between the photoreceptor 110 and the transfusing member 128. The negatively charged toner layer on the photoreceptor is attracted onto the positively charged transfusing member.

After the first toner image is transferred to the transfusing member 128 the image area passes to a cleaning station E. The cleaning station E removes any residual development material remaining on the photoreceptor 110 using a cleaning brush contained in a housing 132.

After passing through the cleaning station E the image area repeats the charge-expose-develop-transfer-clean sequence for a second color of developer material (say yellow). Charging station A recharges the image area and exposure station B illuminates the recharged image area with a light representation of a second color image (yellow) to create a second electrostatic latent image. The image area then advances to a second development station F which deposits a second negatively charged development material 134, which is comprised of yellow toner particles, onto the image area so as to create a second toner layer. The image area and its second toner layer then advances to the transfusing module D where the second toner layer is transferred onto the transfusing member 128.

The image area is again cleaned by the cleaning station E. The charge-expose-develop-transfer-clean sequence is then repeated for a third color (say magenta) of development material 136 using development station G, and then for a fourth color 138 (cyan) of development material using development station H.

Turning our attention to the transfusing module D, the transfusing member 128 is entrained between a transfuse roller 140 and a transfer roller 144. The transfuse roller is rotated by a motor, which is not shown, such that the transfusing member rotates in the direction 146 in synchronism with the motion of the photoreceptor 110. The synchronism is such that the various toner images are registered after they are transferred onto the transfusing member 128.

Figure 1:
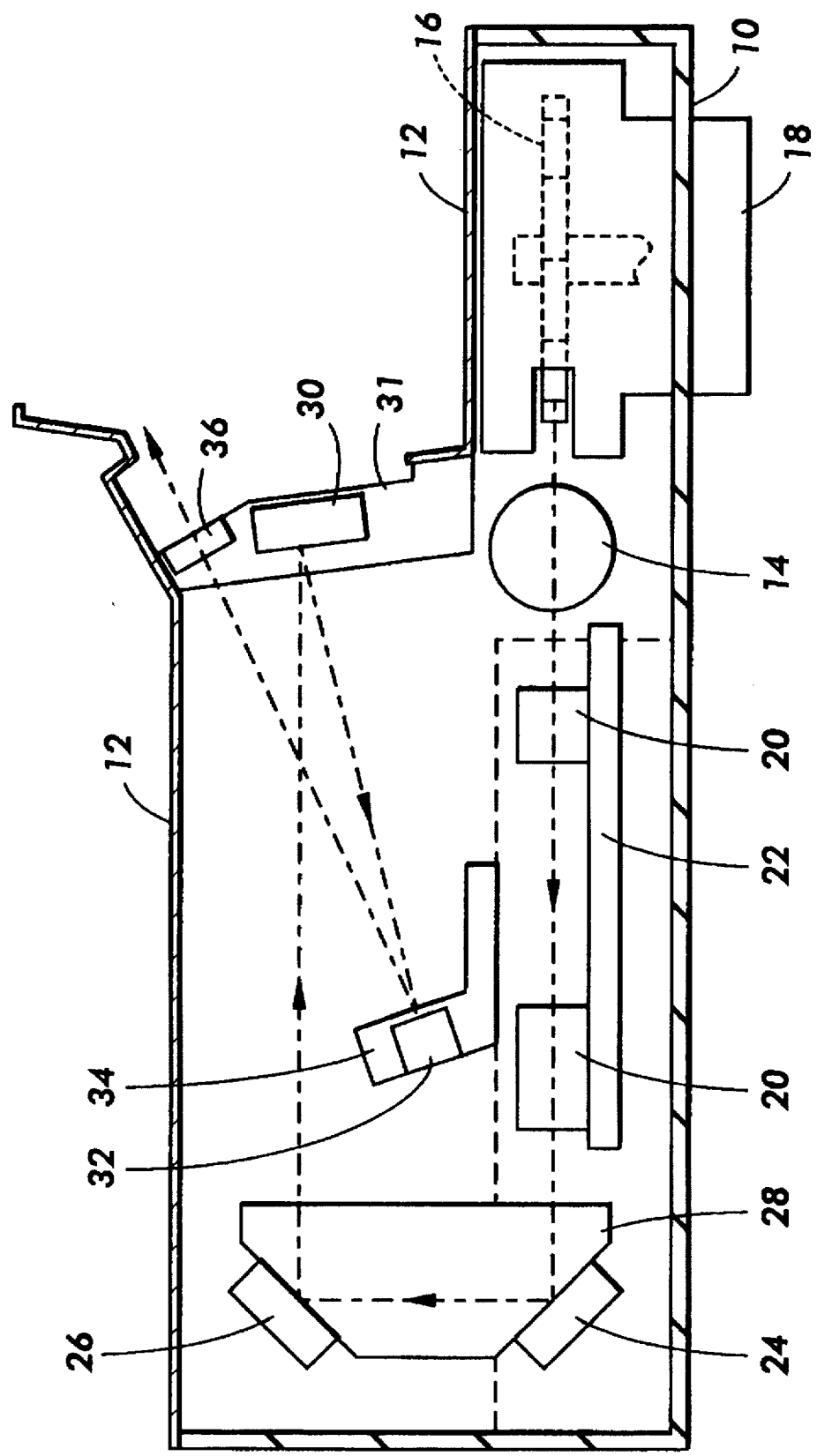
FIG. 1 schematically illustrates a side view of a typical prior art raster output scanner.

Still referring to FIG. 1, the transfusing module D also includes a backup roller 156 which rotates in the direction 158. The backup roller is beneficially located opposite the transfuse roller 140. The backup roller cooperates with the transfuse roller to form a second nip which acts as a transfusing zone. When a substrate 160 passes through the transfusing zone the toner layer on the compression layer is heated by a combination of heat from a radiant preheater 161 or from conductive heat from a conductive heater 162 and heat from the transfuse roller 140. The combination of heat and pressure fuses the composite toner layer onto the substrate.

As mentioned above, the raster output scanning assembly 124 is shown in more detail in FIG. 3. The raster output scanning assembly is mounted in and on an outer frame 200 which includes a perimeter defining wall 201. Interior to the outer frame is a laser assembly 202, beneficially comprised of a laser diode and a set of collimating optics, which outputs a laser beam that is directed toward facets of a polygon 204. The polygon is rotated by a motor 208. The laser beam reflects from the polygon facets as a sweeping beam which passes through a set of output optics comprised of scan lenses 210 which focus the sweeping beam into a spot on the photoreceptor 110 (see FIG. 2 and the above description) and which corrects for various optical errors (such as wobble).

The laser beam from the scan lenses 210 pass through a slit in the outer frame 200 and is reflected from a first mirror 212. The first mirror is mounted with its primary surface, that being the surface which reflects the laser beam, on the exterior of the wall 201. This enables the outer frame to be reduced in size by the width of a lens and by the volume of a mirror carriage.

The laser beam which reflects from the first mirror 212 is directed back into the interior of the outer frame and through a second slit to a second mirror 214, which is also mounted with its primary surface on the exterior of the wall. The laser beam reflects from the second mirror back into the outer frame and through a third slit in the wall onto a third mirror 216, which is also mounted with its primary surface on the exterior of the wall. The laser beam then reflects back into the interior of the outer frame, back through the second slit, and back onto the second mirror 214. The laser beam then reflects back into the outer frame and out of an exit window 218 which is located below the first mirror 212.

As in the prior art the outer frame 200 is fitted with a cover 220. As required, a support 222 can be inserted into the outer frame 200 to support the laser assembly 202 and the scan lenses 210.

Mounting the mirrors outside of the outer frame permits the outer frame to be reduced in size by the widths of a mirrors and by the the volumes of the mirror carriages which are no longer required. By mounting the mirrors with their primary surfaces against the outer frame contaminates can be prevented from contaminating the mirror surfaces.

Figure 4:
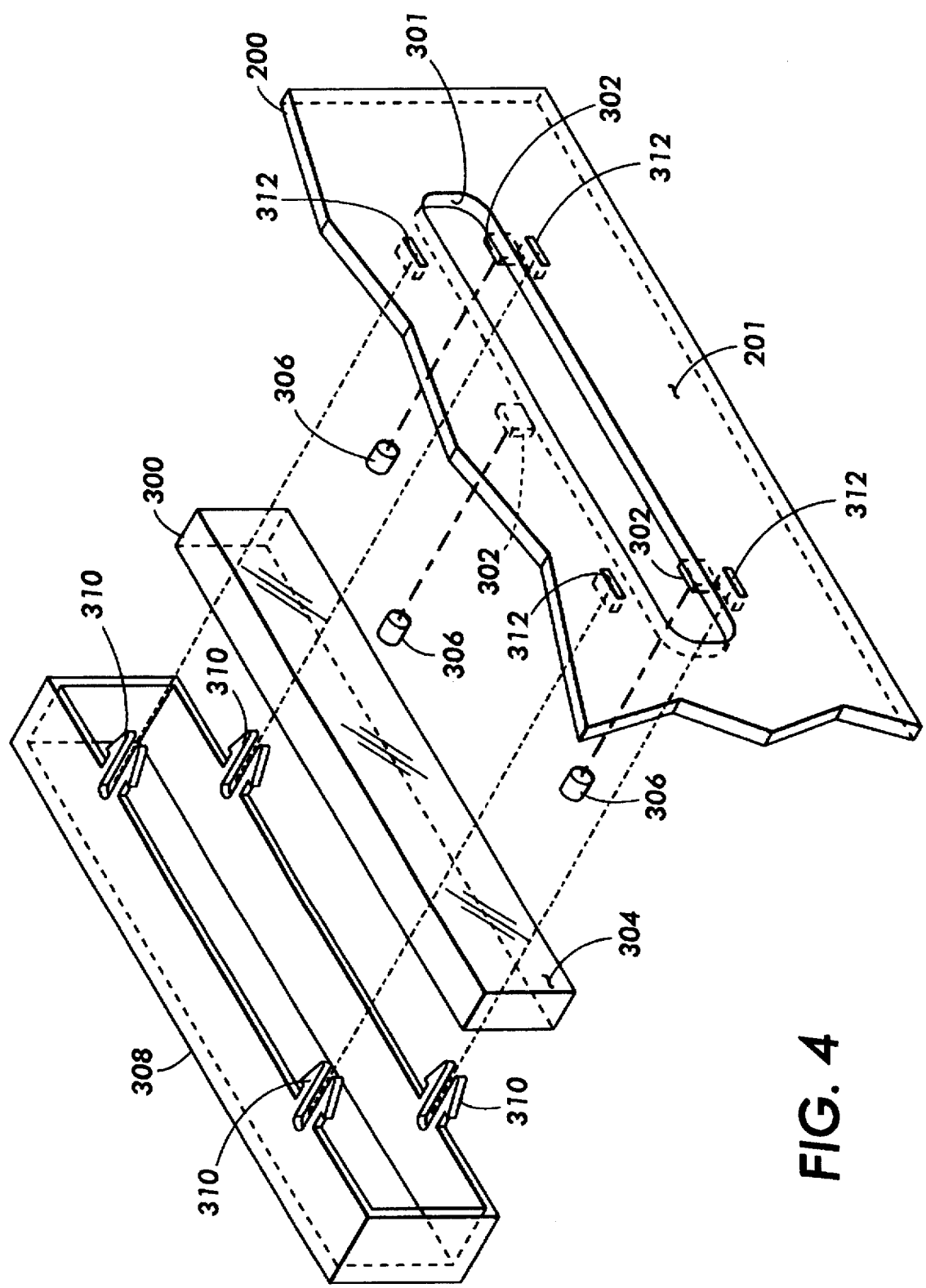
FIG. 4 illustrates mounting a mirror to the exterior of the outer frame.

A method of mounting a mirror 300, which generically represents the mirrors 212, 214, and 216, exterior to the outer frame 200 is shown in FIG. 4. The outer frame wall 201 includes a slit 301 which is surrounded by 3 mounting protrusions 302. Those protrusions form a tri-pod mounting framework for the primary surface 304 of the mirror. Surrounding each protrusion is a spring 306 which will bias the mirror. To locate the mirror in position the mirror is first placed in a cover 308 such that the primary surface 304 faces outward. The cover includes 4 sets of snap-in prongs 310 which protrude beyond the primary surface. Disposed through the outer frame 200 and around the perimeter of the slit 301 are 4 mounting holes 312. To attach the mirror 300 to the outer frame 200 the snap-in prongs of the cover are pushed through the mounting holes such that the springs 306 are compressed by the primary surface of the mirror and such that the prongs clip on the wall 201. The spring bias and prong clips hold the cover and mirror in place.

The electrophotographic marking machine 108 of FIG. 1 is a four color, multiple pass marking machine: one toner image is produced in each rotation of the photoreceptor. While the present invention is useful in machines which produce one toner image per pass, and while the electrophotographic marking machine 108 is useful in explaining the principles of the present invention, the present invention is even more useful in other machine architectures. For example, four color single pass marking machine architectures which produce four toner images during one rotation of the photoreceptor may benefit more from the present invention than four color multiple pass machines. This is because four color single pass marking machines usually use four raster output assemblies per machine A reduction in the size of the raster output assemblies has four times the effect in reducing the overall size of the marking machine. Of course other architectures could also benefit from the principles of the present invention. For example, single color (black) machines and five color machines (the fifth color usually being a custom color) can also benefit.

It is to be understood that while the figures and the above description illustrate the present invention, they are exemplary only. Others who are skilled in the applicable arts will recognize numerous modifications and adaptations of the illustrated embodiments which will remain within the principles of the present invention. Therefore, the present invention is to be limited only by the appended claims.

What is claimed is:

1. A raster scanner assembly comprised of:

an outer frame having a perimeter wall with a first slit, wherein said wall defines an interior section and an exterior:

a laser assembly for generating a laser beam wherein said laser assembly is mounted within the interior section of said outer frame;

a rotating polygon having a plurality of facets for receiving the laser light and for sweeping the laser light in a sweep plane, wherein said rotating polygon is within the interior section of said outer frame;

a scan lens positioned in the sweep plane for receiving and focusing the swept laser light, said scan lens directing said focused laser light through said first slit, wherein said scan lens is within the interior section of said outer frame;

a first mirror for reflecting laser light passing through said scan lens, said first mirror mounted on the exterior of said outer frame and adjacent said first slit such that laser light passing through said slit is reflected back into said interior section of said outer frame;

a second slit in said perimeter wall; and a second mirror mounted on the exterior of said outer frame and adjacent said second slit, said second mirror for reflecting laser light reflected by said first mirror which passes through said second slit back into the interior section of said outer frame.

2. A marking machine comprised of:

a photoreceptor having a photoconductive surface which moves in a process direction;

a charging station for charging said photoconductive surface to a predetermined potential;

a raster scanner assembly for exposing said photoconductive surface to produce a first electrostatic latent images on said photoconductive surface by sweeping a modulated laser beam across said photoreceptor in a fast scan direction which is substantially perpendicular to said process direction;

a first developing station for depositing developing material on said first electrostatic latent image so as to produce a first toner image on said photoconductive surface; a transfer station for receiving said first toner image from said photoconductive surface and for transferring said first toner image onto a substrate;

wherein said raster scanner assembly includes:

an outer frame having a perimeter wall with a first slit, wherein said wall defines an interior section and an exterior area;

a laser assembly for generating a modulated laser beam, wherein said laser assembly is mounted within the interior section of said outer frame;

a rotating polygon having a plurality of facets for receiving the laser light and for sweeping the laser light in a sweep plane, wherein said rotating polygon is within the interior section of said outer frame;

a scan lens positioned in the sweep plane for receiving and focusing the swept laser light, said scan lens directing said focused laser light through said first slit, wherein said scan lens is within the interior section of said outer frame;

a first mirror for reflecting laser light passing through said scan lens, said first mirror mounted on the exterior of said outer frame and adjacent said first slit such that laser light passing through said slit is reflected back into said interior section of said outer frame;

a second slit in said perimeter wall;

a second mirror mounted on the exterior of said outer frame and adjacent said second slit, said second mirror for reflecting laser light reflected by said first mirror which passes through said second slit back into the interior section of said outer frame; and an exit window on said wall, wherein laser light passes to the exterior area.

* * * * *